(No Model.) 4 Sheets—Sheet 3.
H. SNYDER.
STREET SWEEPING MACHINE.
No. 380,534. Patented Apr. 3, 1888.
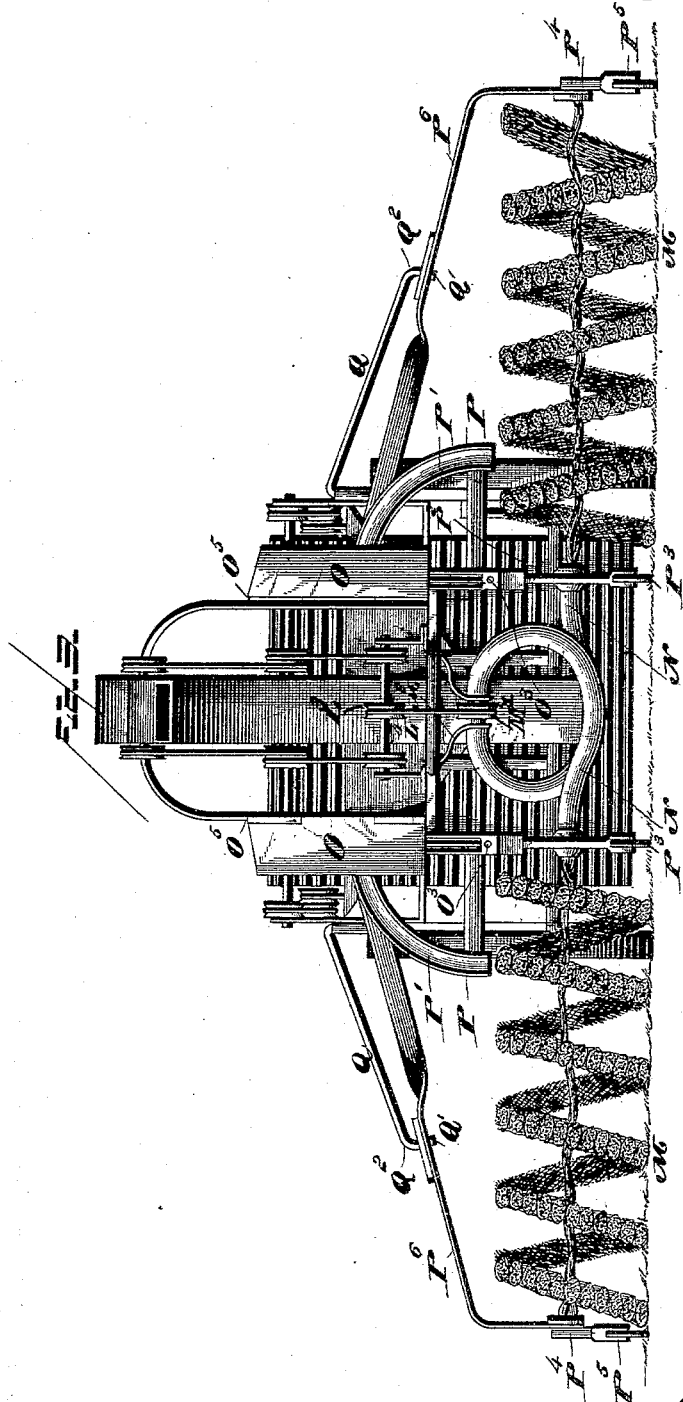
Witnesses:
L. C. Hills,
W. J. Duvall.
Inventor:
Henry Snyder.
By E. B. Stocking
Attorney.

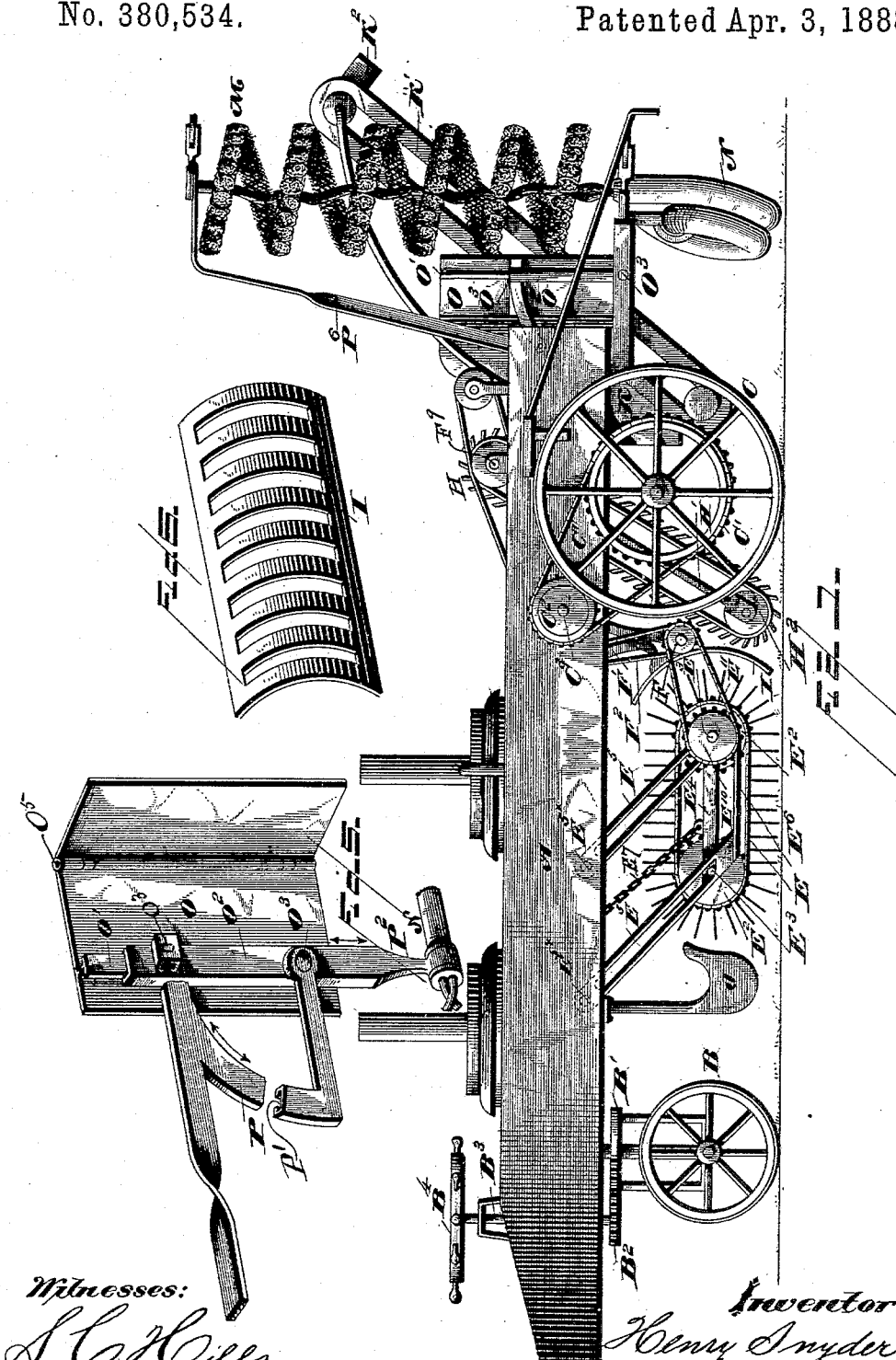

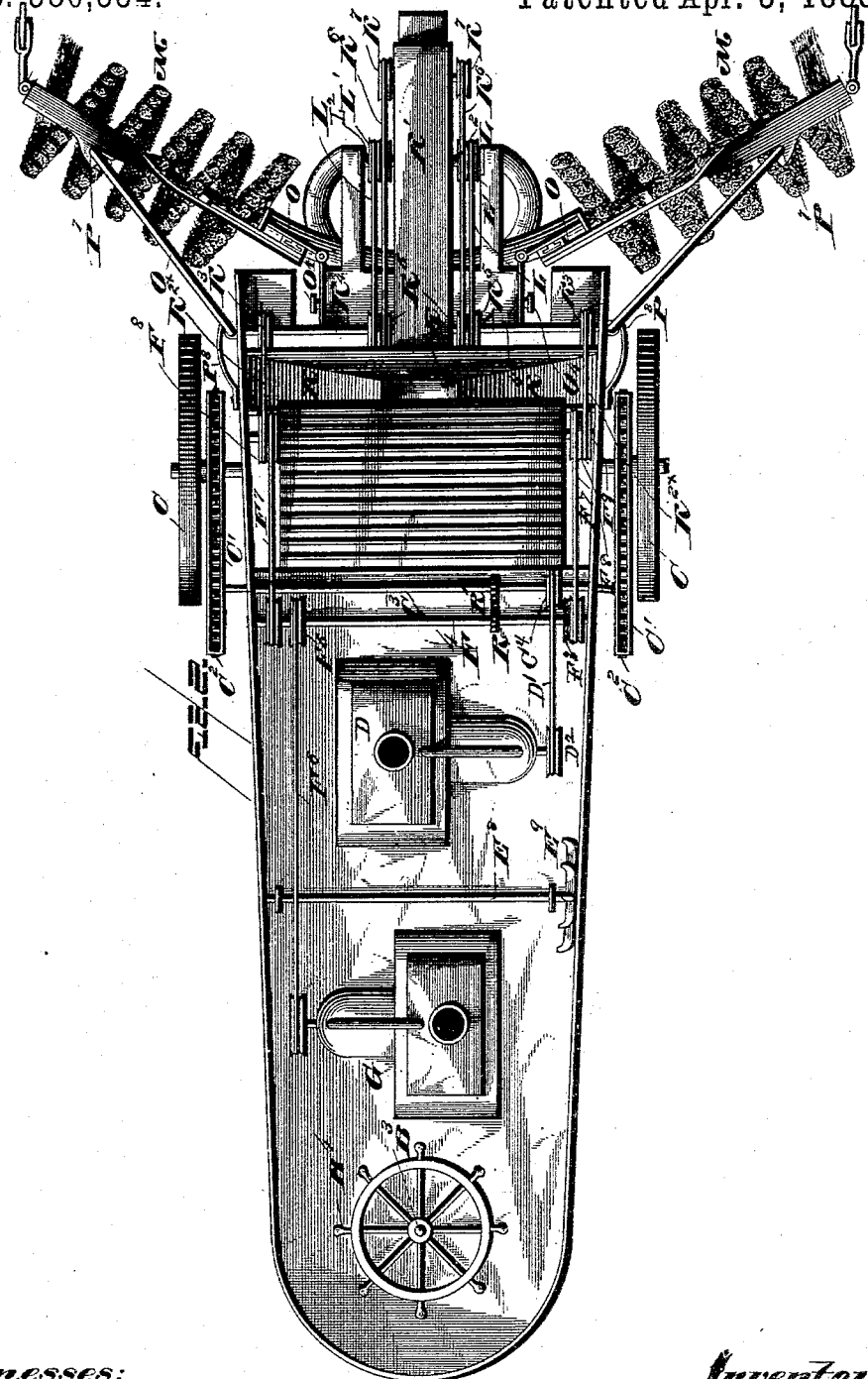

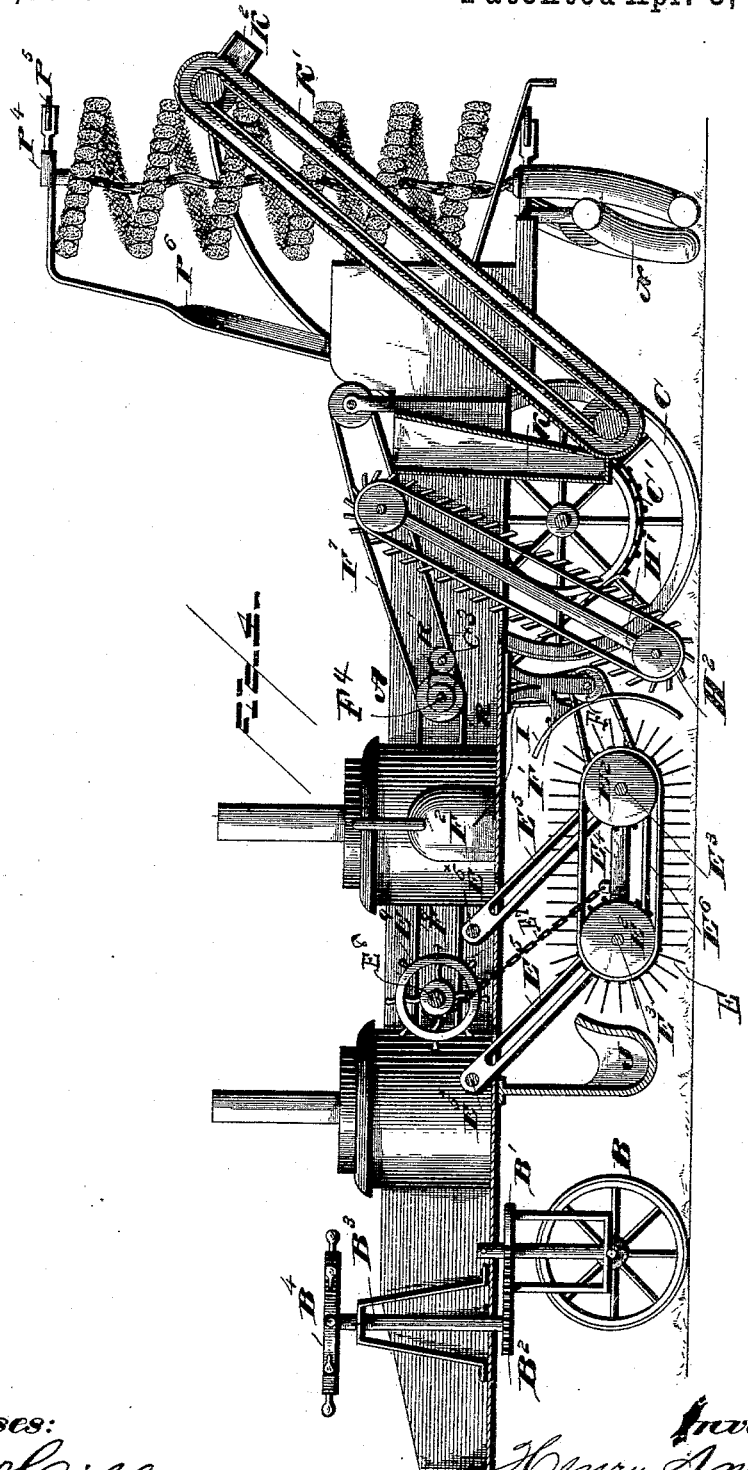

UNITED STATES PATENT OFFICE.

HENRY SNYDER, OF FRANKFORT, NEW YORK.

STREET-SWEEPING MACHINE.

SPECIFICATION forming part of Letters Patent No. 380,534, dated April 3, 1888.

Application filed April 27, 1886. Serial No. 200,349. (No model.)

*To all whom it may concern:*

Be it known that I, HENRY SNYDER, a citizen of the United States, residing at Frankfort, in the county of Herkimer, State of New York, have invented certain new and useful Improvements in Street-Sweeping Machines, of which the following is a specification, reference being had therein to the accompanying drawings.

This invention has relation to street-sweepers, and the construction, advantages, and operation of the same will be hereinafter described, and the novel features thereof particularly pointed out in the claims.

Referring to the drawings, Figure 1 is a side elevation of a street-sweeper constructed in accordance with my invention. Fig. 2 is a plan. Fig. 3 is an end elevation. Fig. 4 is a central longitudinal vertical section. Figs. 5 and 6 are details in perspective, hereinafter described.

Like letters of reference indicate like parts in all the figures of the drawings.

A represents a truck provided with a rear caster or guide wheel, B, which, by means of a sector, B′, and pinion $B^2$, meshing therewith and secured to a steering-wheel shaft, $B^3$, having a hand-wheel, $B^4$, serves to direct the course of the machine when in operation.

The front wheels, C, are the traction or driving wheels of the entire machine—that is to say, serve as a means for propelling the truck upon which the operative devices are mounted, and this function of the traction-wheels is performed through the medium of endless chains C′, properly connected with the wheels C and with sprocket-wheels $C^2$, mounted upon the ends of the transverse shaft $C^3$, which is geared to a propelling-engine, D, mounted on the truck, in this instance by means of an endless chain, D′, running from the sprocket $C^4$, on the shaft $C^3$, to a similar sprocket, $D^2$, mounted upon the engine-shaft.

As thus far described, it will be seen that the truck and all of the mechanism mounted thereon may be moved from place to place in any desired direction.

E represents the center brush, which in this instance consists of wires or bristles mounted on endless steel bands bolted together passing over sprockets $E^2$, mounted upon shafts $E^3$, arranged in the frame $E^4$. This frame is adapted to slide in slotted hangers $E^5$, pivotally secured, as at $E^{5*}$, to the truck, and connected at their lower ends by a cross-bar, $E^6$, so that by means of chains $E^7$, passing over the transverse shaft $E^8$, having a hand-wheel, $E^9$, attached thereto, and any suitable pawl-and-ratchet mechanism, the endless center brush may be retained wholly out of contact with the ground to render it inoperative or lowered for operation.

At the outer end of one of the sprocket-shafts $E^3$ is a sprocket-wheel, $E^{10}$, connected by an endless chain, $E^{11}$, to a sprocket, F, supported in brackets F′, depending from the truck and connected by a sprocket-chain, $F^2$, with a double sprocket, $F^3$, mounted upon a transverse shaft, $F^4$, arranged upon the truck. The shaft $F^4$ has also a sprocket, $F^5$, which, by means of an endless chain, $F^6$, connected with an engine, G, serves to operate the shaft and the mechanism connected therewith. The double sprocket $F^3$ is connected by a chain, $F^7$, with a double sprocket, $F^8$, mounted upon a shaft, $F^9$, a duplicate chain, $F^7$, connecting these shafts at the opposite side of the machine. The shaft $F^9$ is provided with sprockets which serve to support and operate an endless collecting-elevator, H, formed of steel sections bolted together supported in hangers H′, depending from the truck and provided at their ends with other elevator-supporting sprockets $H^2$. A rope or chain or a fixed bracket or other desirable device may be employed to maintain the lower end of the collecting-elevator at a short distance from the ground.

Between the collecting-elevator and the endless center brush there is inserted a guard, I, which consists of a metal lattice-work, the mesh of which is sufficiently coarse to permit ordinary dust and dirt to pass therethrough, but at the same time to prevent the passage of sticks, stones, and other larger refuse liable to collect upon streets. This refuse is, by reason of the curved form given the guard, directed upwardly and upon an endless brush to be conveyed by its upper moving portion toward the rear of the machine, where said substances are by the brush delivered into a receptacle, J, from which said articles may be removed at desired times. The object of separating this coarser refuse is to prevent its interfering with the subsequent elevation and delivery of the finer particles of dust and dirt which are carried up by the collecting-elevator and delivered over the top thereof into a hopper, K, from which extends an elevator, K', of usual construction, having its delivery-spout K² in such position as to deliver substances carried up into a truck or other receptacle mounted on or connected to or preceding the sweeping-machine.

The delivering-elevator K' is run by means of an endless chain, K²*, connected with the opposite spockets F⁸ on the shaft F⁹, which chains gear with sprockets K³, mounted on shaft K⁴, having double sprockets K⁵, from which extend chains K⁶ to sprockets K⁷, secured to the upper shaft of the elevator.

L L represent chains running from the double sprockets K⁵ to sprockets L', mounted on a shaft, L², which serves to operate the side brushes, M, of the machine by means of a central sprocket, L³, (see Fig. 3,) which is connected by a chain, L⁴, with a sprocket, M', mounted upon a shaft secured in brackets M², and connected by means of flexible shafts N to the shafts of the brushes M. The flexible shaft N of each brush is carried beyond the center of the machine and recurved toward and connected with the sprocket M', so as to give the necessary length of flexible shafting to permit of the different dispositions of the brushes M, hereinafter described.

The manner of supporting and operating the brushes M is as follows: O represents a hinged or otherwise pivotally-supported leaf or plate extending from the rear of the truck, one at each side thereof, and as both are similar a description of one will be sufficient. This plate O has a rib, O', arranged or formed vertically thereon, which rib is T-shaped in cross-section. Upon the T-rib a slide, O², is mounted and has at its lower end a pin, O³. The lower pin, O³, passes through a sector, P, and the upper pin, O³, has a T-head and rides in a T-slot, P', in the curved portion of the sector, so that said sector may be raised and lowered on the plate O, as well as oscillated on the lower pin of the slide. A similar T-headed pin is arranged upon the truck, as at O⁴, (see Fig. 2,) to be embraced by the T-groove P' of the sector when it and the plate are swung to the front and the sector oscillated on its lower pin, O³. The sector is extended in the form of a standard, P², having a caster, P³, and to this standard is secured in suitable boxes the end of the flexible shaft N, at which point the shaft of the brush is secured. The outer end of the shaft of the brush M is journaled in a similar support, P⁴, having a caster, P⁵, the said support being extended upwardly and secured to the upper part of the sector P. Guy-rods Q are pivotally secured to the truck and removably connected with the extensions of the supports P⁴, which removable connection may be secured by passing the hook ends Q' Q² of the guides through holes in the extensions P⁶, or said connection may be obtained by forming projections P⁷ (see Fig. 1) and providing springs P⁸ to maintain the free end of the guy-rods Q in contact with said projections. In any backward movement the brush swings on the pivot O⁵ of the plate O.

In Figs. 1 and 4 the brush is shown as elevated out of operative position, while in Figs. 2 and 3 they are shown as depressed into their operative positions.

By providing an extra sprocket, R, on the shaft F⁴, and a companion sprocket, R', on the shaft C³, and a suitable chain for connecting the two sprockets, as shown in Figs. 2 and 4, both engines may be employed in the sweeping and the propelling functions of the machine, whereby the surplus power in either engine may be diverted to the assistance of the other—as, for instance, in sweeping streets where the grade is heavy or precipitous.

Having thus fully described my invention and its operation, what I claim is—

1. In a street-sweeping machine, the combination of an adjustable central sweeping mechanism and pivoted side sweeping mechanism, adapted to be swung up out of operative position, substantially as specified.

2. In a street-sweeping machine, the combination of the central sweeping mechanism, a collecting-elevator, an interposed perforated guard, and an imperforate receptacle arranged at the opposite end of the sweeping mechanism to the guard, substantially as specified.

3. In a street-sweeping machine, the combination of a side sweeping mechanism consisting of two rotary brushes, a central interposed transverse driving-shaft, and flexible shafts connecting the shafts and brushes, substantially as shown and described.

4. In a street-sweeping machine, the combination of a rotary brush mounted in a frame comprising a pivoted sector, a hinged plate, and connecting devices between the plate and sector, which permit of oscillation of the sector and brush, substantially as specified.

5. In a street sweeping machine, the combination, with a motor, as D, connected with the traction-wheels, of a separate motor, as G, connected with the sweeping, collecting, and delivering mechanisms, and independent sprockets, as R R', mounted upon parallel shafts, whereby the surplus power of either motor may be directed to the assistance of the other motor, substantially as specified.

6. The combination of the endless sweeper E, the slotted frame E⁵ E⁶, inclined with respect to the truck A, and the elevating mechanism E⁷ E⁸ E⁹, substantially as specified.

7. The combination of the truck A of the hinged plate O, having the T-rib O', the slide O², having the T-groove and pins O³, the sector P, having the groove P', standard P², and caster P³, the brush M, the caster P⁵, standard P⁴, and extension P⁶, substantially as specified.

In testimony whereof I affix my signature in presence of two witnesses.

HENRY SNYDER.

Witnesses:
JAMES FORAN,
J. G. BROADHURST.